United States Patent [19]

Blondin et al.

[11] Patent Number: 5,330,572
[45] Date of Patent: Jul. 19, 1994

[54] METHOD OF SLAKING QUICKLIME CONTAINED IN ASH

[75] Inventors: Jacques Blondin, Cuincy; Oussama Baalbaki, Villeneuve D'Asco, both of France

[73] Assignee: Charbonnages De France (Etablissement Public), Rueil Malmaison Cedex, France

[21] Appl. No.: 867,674

[22] PCT Filed: Jan. 18, 1991

[86] PCT No.: PCT/FR91/00027
§ 371 Date: Jul. 7, 1992
§ 102(e) Date: Jul. 7, 1992

[87] PCT Pub. No.: WO91/10628
PCT Pub. Date: Jul. 25, 1991

[30] Foreign Application Priority Data

Jan. 19, 1990 [FR] France .................. 90 00635

[51] Int. Cl.$^5$ ............................................. C04B 2/04
[52] U.S. Cl. ................... 106/705; 106/707; 106/710; 106/DIG. 1; 106/792
[58] Field of Search ............. 106/705, 707, 710, 723, 106/745, DIG. 1, 792, 793; 264/DIG. 49; 423/18, 19; C04B 2/04

[56] References Cited

U.S. PATENT DOCUMENTS 5,100,473 3/1992 Mitsuda et al. .................. 106/710

FOREIGN PATENT DOCUMENTS 377417 3/1931 Belgium .
2501669 9/1982 France .

OTHER PUBLICATIONS

Chemical Abstracts, vol. 100, 1984, (Columbus, Ohio, US) B. A. Shikhov et al: "Two-step treatment of lime with water in the production of highly dispersed calcium hydroxide", voir p. 109, résumé 36400c Khim. Prom. st. (Moscou) 1983, (11), 674–6.

Chemisches Zentralblat, No. 13, 1960, E. Pischunger et al: "Das Löschen von kalk mit NaCl-und CaCl$_2$-Lösungen" voir p. 4319 & Przemysl chem. 38. 97–99. Feb. 1959 Torun, Uniw. M. Kopernika, Kat. Techn. chem.

*Primary Examiner*—Mark L. Bell
*Assistant Examiner*—Paul Marcantoni
*Attorney, Agent, or Firm*—Griffin Butler Whisenhunt & Kurtossy

[57] ABSTRACT

According to the method fly ash is pre-hydrated using cold water and the mixture is then treated in a receptacle under pressure from superheated or saturated steam at a temperature lying between 130° C. and 250° C. The method is applicable to any substance containing quicklime that is to be slaked.

6 Claims, No Drawings

METHOD OF SLAKING QUICKLIME CONTAINED IN ASH

There are two main categories of fly ash from electricity power stations. Silico-alumina ash has pozzolan-like properties and is used in concrete and mortar. Sulfur-lime ash has both pozzolan-like properties and hydraulic properties and could be used more widely as a hydraulic binder in concrete and mortar. This second category occurs, in particular, as a by-product resulting from power stations burning a powder mixture of coal and lignite in varying proportions. This fly ash includes a high proportion of calcium compounds, in part as initially present in the combustion products, and in part as added to the combustion by-product during treatment to remove sulfur from the smoke, hence the term "sulfur-lime".

Quicklime, which is sometimes present in large quantities in the calcium compounds confers an undesirable tendency on mortar or concrete constituted in part by such ash, whereby the mortar or concrete swells, thereby limiting the uses to which they may be put. It is known to be desirable to slake this quicklime without simultaneously spoiling the hydraulic and pozzolan-like potential of the other materials in the ash.

Quicklime swells on hydration because of a phenomenon whereby quicklime gives rise to slaked lime having an apparent volume of more than twice the volume of the quicklime. In addition, since the quicklime in fly ash hydrates very slowly, swelling phenomena may appear several weeks or months after concrete containing untreated raw ash has been cast.

For some types of ash (e.g. from a fluidized bed) in which the quicklime is slaked by water together with setting phenomena, it may also be advantageous to slake the quicklime prior to use in order to avoid, inter alia, giving off the heat which corresponds to slaking during implementation.

It is difficult to slake quicklime contained in ash. The water applied to the raw ash should not hydrate the lime aluminates and silicates that confer pozzolan-like properties to the ash. In addition, the quicklime present in fly ash obtained by burning a fuel hydrates very slowly, apparently because of the presence of the silicates and the aluminates which, by combining with the slaked lime in the first place, slow down hydration to the cores of grains of quicklime. It can thus be understood that slaking ash must satisfy two contradictory conditions: hydrating the mixture for long enough to slake all of the quicklime; while simultaneously interrupting the effect of this hydrarich prior to destroying the hydraulic and pozzolan-like properties of the mixture.

Solutions to this contradiction are disclosed in Document FR-A-2 501 669. It is known that hydration at above 120° C. does not spoil the hydraulic properties of the silicates and aluminates present in ash. Proposals have therefore been made to slake ash at this temperature and under pressure so as to have liquid phase water available, since quicklime does not have affinity for steam when the ash is too hot to allow the steam to condense. However, the method proposed in Document FR-A-2 501 669 suffers from a certain number of drawbacks since it requires the ash to be prior heated and it requires a reaction vessel into which superheated hydration water can be injected at a temperature greater than 130° C., which water must not vaporize before it has reacted with the ash, the method further requiring means for stirring the ash in order to ensure that it mixes intimately with the superheated water.

The present invention seeks to provide a cheaper alternative to this method of treatment, enabling ash to be treated at ordinary temperature in a first stage of the method and then proceeding with a second stage of the treatment at a higher temperature and under pressure to finish off the hydration of the quicklime while inhibiting reactions that could lead to a loss of the hydraulic potential of the mixture.

To this end, the present invention provides a method of slaking fly ash containing quicklime, the method comprising a first stage in which the ash is wetted at ambient temperature and a treatment second stage consisting in passing the mixture prehydrated in this way into a receptacle under pressure from saturated or slightly superheated steam at a temperature lying in the range 130° C. to 250° C. It is possible to opt for performing both stages in the same receptacle, in which case it is important to ensure that prehydration is complete (purpose of the first stage) before beginning vaporization (consequence of the second stage).

Thus, unlike the state of the art, the invention proposes a first stage in the slaking method which consists in prehydrating ash with cold water which it has been observed increases the efficiency of the hot hydration that constitutes the second stage of the method. It is nevertheless desirable to determine the optimum quantity of water for incorporation in the ash in the first stage. This quantity must be greater than the quantity required stoichiometrically for slaking the quicklime that is present, which quantity can be calculated on the basis of the quicklime content of the ash, possibly with corrections for the presence of other oxides such as magnesium oxide.

Above this lower limit, tests have been performed on the final product using the tests defined in Standard P 15-432 "Hot expansion tests" using "Le Chatelier" type needle molds for determining the role of the initial quantity of water and its influence on the final product with respect to slaking. Thus, for ash in which the stoichiometrically required quantity for complete slaking was calculated as being equal to 8%, a quantity of about 20% has been found to be optimum (percentage weight of water relative to weight of ash), where "optimum" is the quantity that gives rise to minimum separation of the Le Chatelier needles.

This fraction also corresponds to a transition zone in the consistency of the cold prehydrated ash mixture under test. Below this quantity, the mixture has a sandy consistency which may give rise to temporary setting, generally accompanied by swelling.

Above this value, the mixture becomes pasty, setting takes place with swelling followed after a greater or lesser length of time by a reduction in mechanical strength and possibly by a return to a powder consistency.

This quantity determines whether intermediate storage between the two stages of the method is possible or not since it determines the time taken for the mixture to begin setting. Precautions must be taken with storage conditions to limit the risk of pozzolan-like properties being reduced and also to take account of the self-consumption of the free lime present in the mixture which runs the risk of reducing the hydraulicity of the slaked ash.

It may be advantageous in this "pre-hydration" first stage to add a setting accelerator. A preferred quantity of calcium chloride is about 2% by weight of ash, also observed after making experimental test pieces and subjecting them to the above-specified tests: other things being equal, this is the quantity of additive which it has been observed gives rise to minimum hot expansion. When calcium chloride is added, it is necessary to determine again the optimum quantity of water for pre-hydration. However, it is also necessary to bear the final destination of the treated ash in mind since chlorine may be unsuitable for the concrete in which the ash is to be included.

When performing the method, with or without an additive in the pre-hydrated water, account should be taken of the highly exothermic nature of the reaction and the considerable swelling and evolution of steam that takes place during the hours following the first stage.

In the second stage of the method of the invention, the temperature range 130° C. to 250° C. has been chosen for the following reasons:
- studies show that below 120° C. aluminares and silicates run the risk of being attacked by excess water and that the ash therefore runs the risk of losing its pozzolan potential;
- there is a theoretical upper limit of 400° C. at which free lime decomposes into quicklime and water; and
- with the ash tested it has been observed that the quicklime is slaked most quickly at an ash temperature of 220° C.

This second stage may be performed in the presence of steam at atmospheric pressure or at a higher pressure (e.g. in the range 1 bar to 25 bars). The steam pressure generated by the excess water may be increased by injecting additional steam before or after the observed pressure equilibrium point without adding anything other than hydration water.

During this second stage, the ash loses the water added thereto during the cold first prehydration stage and not used up for slaking. Any water that may be added to the ash during the second stage by condensation or trickling has a harmful effect on the final product insofar as it gives rise to lumps that remain damp. Devices should therefore be provided in the equipment used suitable for adjusting the pressure together with devices suitable for preventing condensation from trickling into the ash, or else to prevent condensation taking place. In this respect, a heated double walled vessel may be preferable to mere lagging.

The operating pressure is an important parameter for the installation in which the method is performed. The pressure chosen depends on an economic compromise between the investment cost (pressurized reaction vessel and steam generator) and the duration of the second stage of the slaking cycle, for a previously selected degree of slaking. With the ash tested, the same less than 3 mm hot separation of the Le Chatelier needles on a pure paste has been observed with the duration of the second stage being reduced from 16 hours to 1 hour by changing from first conditions of superheated steam at 130° C. and at atmospheric pressure to second conditions of saturated steam at a pressure of 5 bars.

In the method of the invention the treatment second stage may be performed without stirring the ash, but stirring is nevertheless advisable for questions of uniformity and of vaporizing excess water. Considerable swelling takes place and must be taken into account when determining the capacity and the mechanical strength of the treatment vessel, which swelling has the advantage of finely dividing the ash without requiring mechanical crushing. At the end of the cycle of this second stage, the ash is in a state suitable for being transported pneumatically, and advantage may be taken of any excess pressure established inside the vessel.

The main advantages of the method of the invention lie firstly in the possibility of reducing the time required for ash hydration. This reduction has a significant effect on production costs. In addition, such acceleration is not obtained to the detriment of the hydraulic properties of the slaked ash.

The residual humidity of the ash is generally less than 0.5%, thereby ensuring that hydration will not continue during storage and before use. The ash produced by the method is in an easily-handled powder state. By beginning with cold prehydration and by accurately determining the quantity of water required for the treatment, it is possible to conserve the pozzolan-like properties of the ash completely.

Finally, both in its first stage and in its second stage, the method of the invention limits the risks of the product deliming (when cold the reactivity of the ash is low and when hot the ash is under a protective atmosphere of steam).

After being slaked in this way, the tested ash has been incorporated in certain mortars as a substitute for Portland cement, and the test pieces made in this way have been subjected to compression tests. A significant improvement in compression strength has been observed for a preparation in which at least 10% of the cement was replaced by fly ash slaked by the method of the invention.

We claim:

1. A method of slaking quicklime in fly ash to provide a hydraulically settable mixture, comprising:
   (1) wetting the ash at ambient temperature in a first stage with a quicklime slaking stoichiometric excess of cold water to form prehydrated ash such that the quicklime therein is completely wetted but without hydration of compounds in the fly ash other than quicklime and wherein the cold water is up to 20% by weight of the ash; and
   (2) contacting the prehydrated ash at a temperature between about 130° C. and 250° C. in a receptacle in a second stage with steam under pressure such that hydration of the quicklime is substantially completed, excess water is eventually vaporized and hardening of the ash is prevented.

2. The method according to claim 1, characterized in that the second stage is carried out under elevated steam pressure.

3. A method according to claim 2, characterized in that the steam is saturated steam.

4. A method according to claim 1, characterized in that the water used in the first state has about 2% by weight of the ash of at least one setting accelerator added thereto.

5. A method according to claim 4, characterized in that the setting accelerator is constituted by calcium chloride.

6. A method according to claim 1, characterized in that the second stage is performed at a pressure lying in the range 1 bar to 25 bars.

* * * * *